Z. STREET.
Stock Car.
No. 106,888.
2 Sheets—Sheet 1.
Patented Aug. 30, 1870.
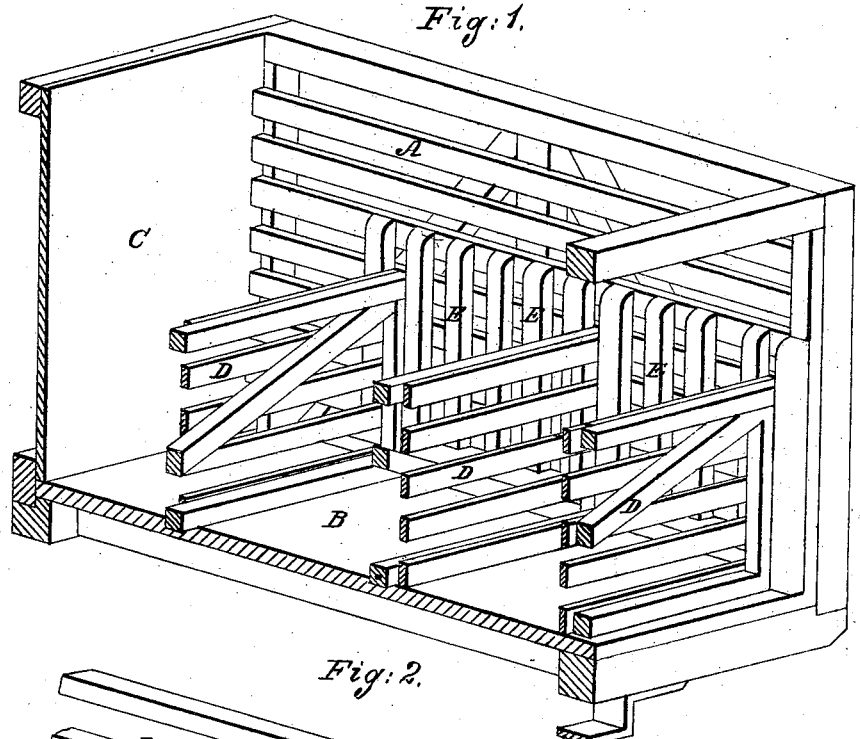
Fig: 1.
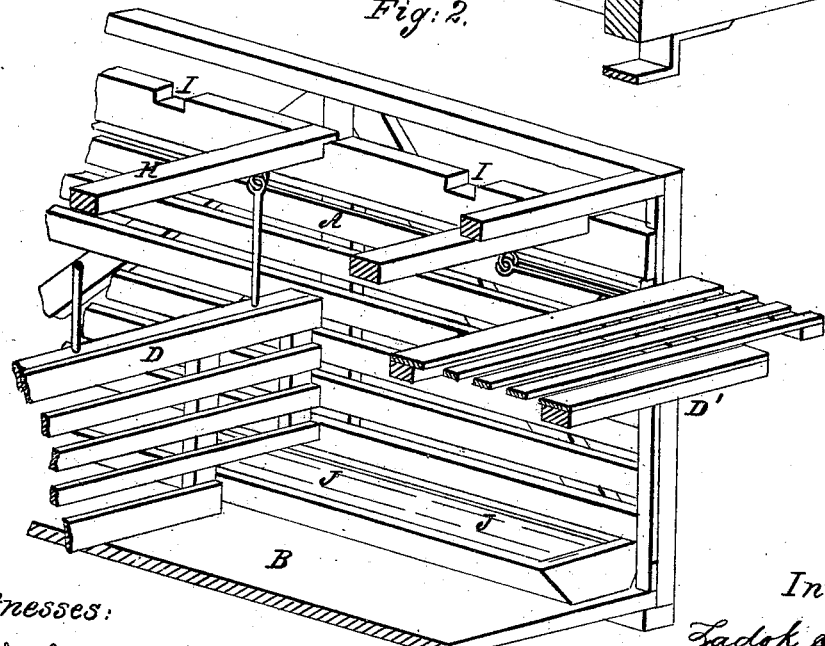
Fig: 2.
Witnesses:
Inventor.
Zadok Street
By Knight Bros
Attys Z. STREET.
Stock Car.

No. 106,888.

2 Sheets—Sheet 2.

Patented Aug. 30, 1870.

Witnesses:

Inventor.
Zadok Street,
By Knight Bros
Attys

UNITED STATES PATENT OFFICE.

ZADOK STREET, OF SALEM, OHIO.

IMPROVEMENT IN STOCK-CARS.

Specification forming part of Letters Patent No. 106,888, dated August 30, 1870.

*To all whom it may concern:*

Be it known that I, ZADOK STREET, of Salem, in the county of Columbiana and State of Ohio, have invented certain Improvements in Railway-Cars for Carrying Stock and other Freight; and that the following is a sufficiently full and exact description thereof to enable one skilled in the art to which my said invention appertains to carry it into effect, reference being had to the accompanying drawing, which forms part of this specification, and represents, in perspective, parts of the body of the car under various forms and modifications.

The invention consists of a convertible car, adapted for carrying large or small stock by shifting certain of the interior arrangements, or of carrying ordinary freight by the removal of the partitions and supplementary floor, the said portions being stowed above, out of the way.

The specific features of invention refer to a certain arrangement of the transverse partitions of the car when fitted for cattle or horses, and to a mode of dividing the car by a longitudinal partition when adapted for the carriage of sheep and hogs.

A A represent the sides, B the floor, and C C the ends, of the car.

Figure 3:
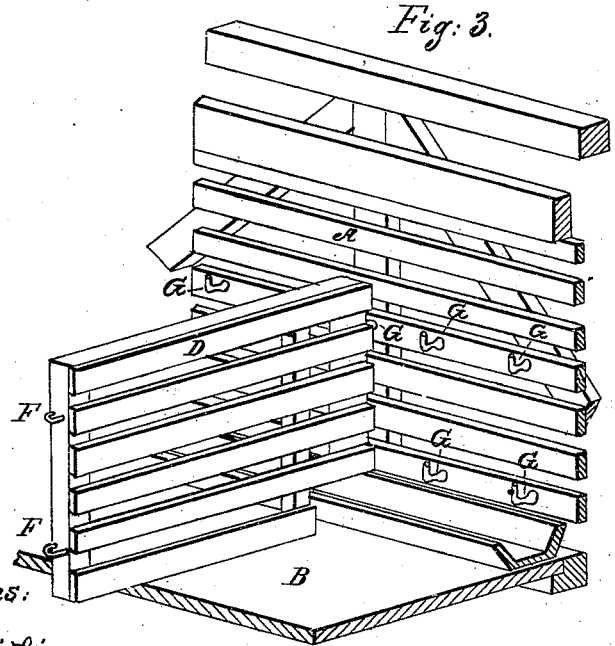

The movable gates or partitions D D D may be secured, at any required distance apart, between cleats E E, as shown in Figure 1, or with staples F and hooks G, as shown in Fig. 3, or, as represented in Fig. 2, may swing from beams H, which may themselves be adjusted in either of the notches I I I, so as to vary the size of the stalls.

The last arrangement is very convenient in loading cattle, the gates or partitions being supported in horizontal position, as shown at D', and lowered successively as each animal takes his place in the car.

J represents a trough for feeding and watering.

Figure 4:
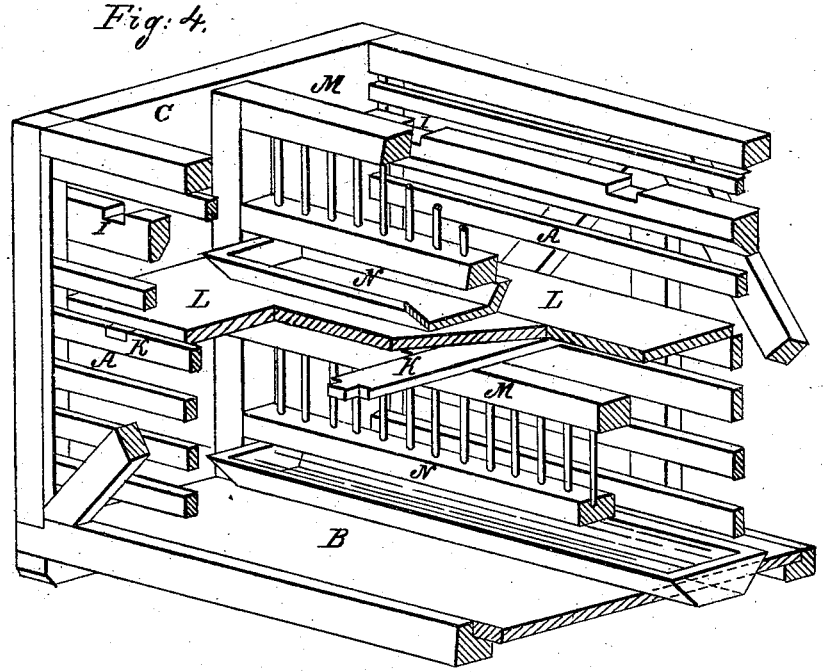

Fig. 4 shows my car as arranged with double decks and longitudinal partitions for the transportation of small stock, such as hogs and sheep. K K are movable beams, whose shouldered ends $k$ rest in notches $i$. These beams support the movable flooring L, to form the upper deck of the car.

M M are central longitudinal partitions, and N N the troughs for food and water.

Instead of placing the trough at the side, as shown in Figs. 1, 2, and 3, as is requisite for cattle, the trough N in the double-decked and longitudinally-partitioned arrangement of the car extends along the center, directly under the partitions M, so that one trough may serve for the animals on both sides of the car, and so that it may not obstruct the air.

This last feature is found very important in the case of hogs, and especially fat hogs, which lie down almost constantly, except when feeding, and are often suffocated from being crowded together with insufficient air.

It has been found in practice, in carrying hogs in my improved car, that, after getting up and turning round to feed, they invariably turn back again and present their noses to the outside in lying down. This illustrates at once the importance of an abundant supply of fresh air to the animals and the effectiveness of the simple means I have devised to secure it.

By my improved cars stock of all descriptions may be transported to any distance without suffering and without loss of health or flesh.

The removability of all the interior fittings of the car adapts them to be stowed away compactly in its top, and supported by the beams H or K, resting in the upper notches, I, Figs. 2 and 4, so as to leave the main body of the car unobstructed and free for the stowage of any description of freight for return trips.

Having thus described my invention, what I claim and desire to secure by Letters Patent, is—

1. The partitions D, suspended from a movable transverse beam, and adapted to swing upward out of the way of the cattle, or for the reception of freight, as the case may be.

2. The partition M, adapted to divide the car longitudinally for the use of the smaller kinds of stock.

ZADOK STREET.

Witnesses:
OCTAVIUS KNIGHT,
WM. H. BRERETON, Jr.